UNITED STATES PATENT OFFICE 2,657,195

LINEAR POLYMERS FROM STILBENE DICARBOXYLIC ACID

William G. Toland, Jr., Richmond, Calif., assignor to California Research Corporation, San Francisco, Calif., a corporation of Delaware No Drawing. Application March 25, 1950,
Serial No. 151,993

16 Claims. (Cl. 260—75)

1

This invention relates to novel linear polymers and, more particularly, to highly polymeric derivatives of stilbene dicarboxylic acid having valuable and unusual properties.

Linear polymers prepared using a dibasic acid and glycols or diamines are known. Such linear polymers vary widely in character depending on the particular dibasic acid and glycol or diamine used in their preparation, but without exception they are devoid of optical characteristics such as fluorescence whereby the general appearance of filament fibers and materials produced from them is greatly improved. In addition, these linear polymers known to the prior art are ordinarily poor in dyeing qualities since they are low in reactivity and are not receptive to dyestuffs of the usual types. Furthermore, all such linear polymers, including even those of diaryl type structures, are characterized generally by their lack of rigidity in the molecule and thus possess lower melting points which render them more susceptible to deformation by heat.

One object of my invention is to provide new and useful linear fiber-forming polymers having valuable properties including optical characteristics such as fluorescence. Another object is the preparation of linear polymers having improved reactivity such as receptivity for dyes. Still another object of my invention is the provision of linear polymers characterized by their molecular rigidity and the attendant improved properties including higher melting points. A still further object of my invention is to provide a method of preparing new and useful linear polymers from stilbene dicarboxylic acid compounds. Other objects of my invention will appear hereinafter.

I have found that linear fiber-forming polymers possessing fluorescence, improved reactiviity including higher receptivity for dyes, and higher melting points can be obtained by reacting together a stilbene dicarboxylic acid compound and at least one bi-functional reactant of the group consisting of glycols, diamines, and amino alcohols having the formulae HO—R—OH, H₂N—R—NH₂ and H₂N—R—OH where R is an alkylene, cycloalkylene, arylene or aralkylene radical of from about 2 to 16 carbon atoms. A dibasic acid compound other than the stilbene dicarboxylic acid compound can also be used in the reaction along with the stilbene dicarboxylic acid compound according to my invention to produce a mixed acid type fiber-forming linear polymer derivative.

The new and useful fiber-forming linear poly-

2 mers according to my invention are highly polymeric derivatives of stilbene dicarboxylic acid compounds and are characterized by recurring units of the general formula

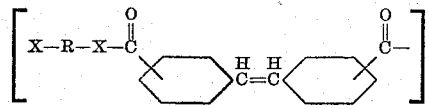

where R is an alkylene, cycloalkylene, arylene or aralkylene radical of from about 2 to 16 carbon atoms, and X is

or —O—.

The stilbene dicarboxylic acid diaryl type compounds used in my invention are unique in having a trifunctional character consisting of two carboxyl groups and an olefinic double bond. In a linear polymer the carboxyl groups only are utilized. The double bond may be used to alter the character of the molecule either before or after polymer formation, by reaction with compounds capable of adding to a double bond. For instance, bromine or other halogens may be added across the bond; hydrogen peroxide or potassium permanganate can hydroxylate it; hydrogen halides, hypohalites, and organic acids will add across it; maleic anhydride may undergo a reaction with it, and so on. Products such as those formed by the above reactions will change the nature of the stilbene acid or of the polyester or polyamide very markedly and may be used per se or reacted further as new activation centers to further alter the character of the material. Resultant alterations in properties include improved susceptibility of the polymers to dyeing, due to the incorporation of reactive centers, polar groupings or chromophors; improved thermosetting properties by cross-linking the polymers through the new groups; actual reaction with dyes to form colored polymers; changes in solubility, melting point, and chemical stability of the monomers and polymers, and "drying" of polymers by uptake of oxygen through the double bond.

The stilbene dicarboxylic acid compounds may be any of the ester- and amide-forming derivatives of stilbene dicarboxylic acid, as well as the acid per se. Different isomers of stilbene dicarboxylic acid may be used, such as the ortho, ortho'; meta, meta'; para, para'; ortho, meta'; ortho, para'; etc., but the para, para' isomers hereinafter referred to as the p,p'-stilbene dicarboxylic acid compounds are preferred. Suitable ester- and amide-forming derivatives as, for example, the esters, half-esters, amides, half-amides, ammonium or amine salts, acid chlorides, etc., may be used. The ester-forming derivatives may be aliphatic, cyclo-aliphatic, aromatic or alkyl-aromatic esters of the stilbene dicarboxylic acid, for instance, alkyl esters such as methyl, ethyl, propyl, butyl, amyl, hexyl, heptyl, and octyl stilbene dicarboxylates or cyclo-aliphatic, aryl and alkaryl esters derived from cyclopropyl carbinol, cyclobutanol, cyclopentanol, cyclohexanol, phenol, cresols, benzyl alcohol and the like. The diethyl ester of p,p'-stilbene dicarboxylic acid is generally utilized since it is readily prepared and possesses most of the desirable physical characteristics.

The amide-forming derivatives of the p,p'-stilbene dicarboxylic acid may be any of the aliphatic, cycloaliphatic, aromatic and alkyl aromatic diamine or amine salts of the stilbene dicarboxylic acid. Such diamine or amine salts of the stilbene dicarboxylic acid are utilized primarily when it is desired to produce amide polymers or ester-amide interpolymers of stilbene dicarboxylic acid according to this invention. Salts derived from diamines such as ethylene diamine, trimethylene diamine, tetramethylene diamine, pentamethylene diamine, hexamethylene diamine, 1,4-diamino cyclohexane, p-phenylene diamine, xylylene diamine, etc., are particularly suitable for the purposes of this invention. Ethylene diamine, tetramethylene diamine and hexamethylene diamine salts of p,p'-stilbene dicarboxylic acid are generally preferred.

The glycols, diamines and amino alcohols or their mixtures of two or more which are reacted with the p,p'-stilbene dicarboxylic acid compound according to this invention may be any of those known to the art having alkylene, cycloalkylene, arylene or aralkylene radicals of from about 2 to 16 carbon atoms. Examples of suitable glycols are ethylene glycol, 1,4-butylene glycol, hydroquinone, xylylene glycol, 1,4-dihydroxy cyclohexane, etc. Polymethylene glycols containing an even number of carbon atoms within the range of 2 to 10, inclusive, are especially suitable. However, for this invention ethylene glycol is generally preferred for its availability and for the desirable physical characteristics of the products derived from it. The diamines are generally the same as those already described in respect to the amide-forming derivatives and include aliphatic, cycloaliphatic, aromatic and alkyl aromatic diamines. Aliphatic diamines such as ethylene diamine, tetramethylene diamine and hexamethylene diamine are especially valuable for this purpose. The amino alcohols used according to this invention may be any of the type having alkylene, cycloalkylene, arylene or aralkylene radicals of at least two carbon atoms and are illustrated by amino ethyl alcohol, amino propyl alcohol, amino butyl alcohol, amino amyl alcohol, etc., with amino ethyl alcohol and amino butyl alcohol being preferred.

Dibasic acid compounds other than the stilbene dicarboxylic acid compounds which can be mixed with the stilbene dicarboxylic acid compounds in this invention may be any of the organic acids characterized by the presence of two carboxyl groups. They may be aliphatic, unsaturated aliphatic, cycloaliphatic, or aromatic. Illustrative of suitable aliphatic acids are succinic acid, adipic acid, suberic acid, etc. Unsaturated aliphatic acids which may be used are fumaric acid, maleic acid, etc. Cycloaliphatic dicarboxylic acids such as cyclopentane dicarboxylic acid, cyclohexane dicarboxylic acid, etc., are also suitable. Dicarboxylic aromatic acids which are suitable are illustrated by terephthalic acid and bibenzyl dicarboxylic acid, with terephthalic acid being preferred in this invention.

The broad class of polyester, polyamide and polyesteramide fiber-forming linear polymers from stilbene dicarboxylic acid according to this invention are, briefly stated, prepared by heating a mixture comprising the stilbene dicarboxylic acid compound with an excess of the particular glycol or an equivalent amount of the diamine or amino alcohol used. The general reaction is usually carried out at atmospheric pressure, although subatmospheric or superatmospheric pressures may be utilized when such conditions appear desirable because of unusual physical characteristics of the reactants, such as extremely low boiling points, etc. Agitation is conveniently obtained by bubbling a stream of nitrogen or other inert gas slowly through the reaction mixture, although other means such as mechanical stirrers, etc., are also suitable. Inert atmospheres are preferred. The reaction ordinarily requires heating over a period from about 5 to 20 hours at temperatures of from about 200 to 350° C., and preferably 280 to 300° C. Other temperatures and heating periods sufficient to produce a linear polymer, the filaments of which are suitable for cold drawing, will depend on the particular reactants used and can be determined readily through common testing procedures, illustrations of which hereinafter appear.

More particularly, the fiber-forming linear polyesters of my invention are suitably prepared by heating dimethyl or diethyl stilbene dicarboxylic acid ester, and another dibasic acid ethyl or methyl ester if a mixed acid type of linear polymer is desired, with an excess of the glycol to be used. A small amount of an ester interchange catalyst, for example, 0.025 to 1.0%, based on the total ester may be added, if desired, and the mixture is then heated at atmospheric pressure with gentle nitrogen bubbling until the methanol or ethanol used in esterifying the stilbene dicarboxylic acid, and the other dibasic acid, if present, is evolved from the reaction mixture along with most of the excess glycol if it is sufficiently low boiling. A vacuum may be then applied and the remainder of the excess glycol drawn off. This process ordinarily requires from about 6 to 16 hours and is usually carried out at a temperature of about 280 to 300° C. The product may then be heated further, if necessary, to melt it and filaments formed by extruding under pressure.

Two distinct reactions are involved in the above process of polymerization. The first reaction is the esterification or ester-interchange of the stilbene dicarboxylic acid or its di-ester with the glycol and the resultant formation of the corresponding glycol ester. The second reaction involves the formation of the linear polyester from these simple glycol esters of stilbene dicarboxylic acid and is continued until a reaction product is obtained from which filaments can be formed that are suitable for cold drawing.

The glycol utilized in the formation of the linear polyesters is present in an excess with as high as 10 to 20 mols of glycol per mol of stilbene dicarboxylic acid compound being used preferably. Esterifying catalysts such as hydrogen chloride or p-toluene sulfonic acid may be used to speed up the esterification reaction, if stilbene dicarboxylic acid or any of the other dibasic acids disclosed for the production of mixed acid polyesters per se are used in the reaction. The ester-interchange reaction also can be advantageously promoted by the use of ester-interchange catalysts such as lithium, sodium, magnesium and the like in the form of powder, chips, shavings, etc.

The fiber-forming linear polyamides of stilbene dicarboxylic acid according to this invention are prepared, appropriately, by adding an equivalent amount of a suitable diamine to an aqueous or alcoholic suspension of the acid and recrystallizing the ammonium salt from the alcohol-water solution to purify it. The dried salt obtained from this reaction is then heated slowly without stirring in a gentle current of nitrogen. After the water is evolved, a vacuum is applied and the temperature raised to about 290° C. to form the polyamide. The product may then be melted if necessary and extruded as filaments for cold drawing.

Mixed polyester-amides of stilbene dicarboxylic acid compounds according to this invention are advantageously prepared in two ways: In the first method, mono-(alcohol ammonium) salts of stilbene dicarboxylic acid are formed and then subjected to heat as were the polyamide resins disclosed above. According to the second method, mixed polyester-amides are prepared by reacting the bis(alcohol ammonium) salts of stilbene dicarboxylic acid with a dibasic acid other than stilbene dicarboxylic acid of the type described in the preceding discussion of the specification.

When mixed acid polesters and polyamides are prepared according to this invention, the stilbene dicarboxylic acid compound and the other dibasic acid compound may be used in any desired proportions. Quantities as low as 1% of the stilbene dicarboxylic acid compound impart a definite fluorescent property to the products. Larger proportions of the stilbene dicarboxylic acid product up to 100% give increasing fluorescence. Various proportions of the stilbene dicarboxylic acid compound may be used in the mixed acid polyesters and polyamides to modify the melting point characteristics of the other dibasic acid polyesters and polyamides. The particular proportions necessary to raise or lower the melting points of the products to any desired point are easily determined by workers in the art using known methods of testing. In illustration of the melting point modification properties of the stilbene dicarboxylic acid mixtures, the following results were obtained for the melting point of various polyethylene esters of mixed terephthalic and p,p'-stilbene dicarboxylic acid.

TABLE I

| Mol Percent Stilbene Acid | Mol Percent Terephthalic | M. P. (° C.) |
|---|---|---|
| 0 | 100 | 256 |
| 1 | 99 | 234–237 |
| 10 | 90 | 229–234 |
| 50 | 50 | 400+ |
| 100 | 0 | 400+ |

The above melting points were determined in the usual manner for such materials. A small amount of the highly polymeric substance to be tested was reduced to powder and placed in a glass capillary tube open at one end. The capillary was then fastened alongside the bulb of a thermometer and both thermometer and tube were placed in an oil bath or a metal block with heating means. The temperature of the block was raised slowly until melting of the powder was observed. The temperature at that point was noted and recorded as the melting point for the particular polymeric substance tested.

From the above table it may be seen that mixtures of 50% stilbene dicarboxylic acid with terephthalic acid give polyethylene esters of very high melting points, exceeding those of the straight terephthalic polyester. Mixtures of from 1 to 10% of the stilbene dicarboxylic acid with the terephthalic acid on the other hand lower the melting point.

The following examples illustrate the preparation of linear fiber-forming polymers in accordance with my invention. These examples are to be regarded solely as illustrative and not as restricting the scope of the invention.

*Example 1*

27.0 g. (0.1 mol) p,p'-stilbene dicarboxylic acid, 62.1 g. (1.0 mol) ethylene glycol, 0.3 g. conc. $H_2SO_4$ were charged to a flask equipped with glass paddle stirrer. The mixture was heated to 180° C. for 3 hours with only a few drops of water being evolved. The temperature was raised to 230° C. for two hours without evidence of further reaction. As the mixture was too thick for good stirring, it was cooled to 150° C. and another 62.1 g. glycol and 0.3 g. $H_2SO_4$ added. Heating was continued for about 6 hours at about 180° C. At the end of this time there was an evolution of about 75 ml. of volatile material. The material remaining in the flask was a brown, rubbery mass, flexible but non-tacky at temperatures below 150° C. and softening above this temperature. When softened, it was drawn into threads and films of good strength and toughness. Under ultraviolet illumination, these films and fibers exhibited a strong, blue fluorescence.

*Example 2*

The diethyl ester of p,p'-stilbene dicarboxylic acid was prepared as follows: 100 g. p,p'-stilbene dicarboxylic acid and 400 g. of thionyl chloride (sulfurous oxychloride) were refluxed in a flask for 24 hours with occasional agitation by shaking. The mixture was then cooled to room temperature and 200 ml. of chloroform were added followed by 200 mls. of absolute ethanol added dropwise. The addition of the ethanol was accompanied by a vigorous evolution of gas. After addition of ethanol, the mixture was refluxed for about 4 hours and allowed to stand overnight, after which the solution was decanted into a beaker. The crystals remaining in the flask were transferred to the beaker by dissolving in hot chloroform. The material in the beaker was then evaporated to near dryness, taken up with 2 liters chloroform, heated to boiling and filtered. The filtrate was concentrated on a steam hot plate and then dried at 90° C. under 5 mm. pressure for 7–8 hours to yield 122.2 g. of crystals (121.0 g. theoretical). The product was recrystallized from ethylene dichloride-alcohol mixture and washed with alcohol.

| Inspections | Found | Theory or reported for diethyl ester |
|---|---|---|
| Melting point ° C | 130–131.5 | 130–131 |
| Saponification number | 160, 162 | 162.2 |
| Acid number | trace | 0 |

This ester was used as an intermediate in the polyester preparations described in the following examples.

Example 3

The diethyl ester of p,p'-stilbene dicarboxylic acid described in Example 2 was reacted with ethylene glycol as follows:

32.4 g. of the diethyl ester was placed in a flask with 100 ml. ethylene glycol and a small piece of sodium and a few magnesium turnings. The mixture was heated slowly with stirring until the diethyl ester was completely dissolved. Heating was then continued until the temperature reached 190° C., ethyl alcohol being taken off as it was formed. The excess ethylene glycol was next distilled off at a pot temperature of 190–200° C. A vacuum was then applied and the heating continued until no more glycol could be drawn off. The product was a fluorescent solid melting at about 420° C. with some decomposition.

Example 4

The procedure in Example 3 was repeated with the following ingredients:

| | |
|---|---|
| Diethyl ester of p,p'-stilbene dicarboxylic acid from Example 2 | 16.22 g. |
| Polyethylene terephthalate | 9.61 g. |
| Ethylene glycol | 100 ml. |
| Sodium | small piece |
| Magnesium | 1 turning |

The product melted with some decomposition above 400° C. A portion of the melted product was extruded through an orifice and was found capable of forming a fiber.

Example 5

Experiment 3 was repeated using the following ingredients:

| | |
|---|---|
| Diethyl ester of p,p'-stilbene dicarboxylic acid from Example 2 | 31.0 g. |
| 1,5-pentanediol | 50 g. |
| Magnesium | 1 turning |
| Sodium | small piece |

The product could be extruded at elevated temperatures to give filaments.

Example 6

The procedure in Example 3 was repeated using the following ingredients:

| | |
|---|---|
| Dimethyl terephthalate | 17.48 g., 0.09 mole |
| Diethyl ester of p,p'-stilbene dicarboxylic acid from Example 2 | 3.24 g., 0.01 mole |
| Ethylene glycol | 50 ml. |
| Sodium | 1 small piece |
| Magnesium | 1 turning |

The product was extruded into a fiber which showed good fluorescence and fair strength. The melting point was about 230° C.

Example 7

The procedure of Example 3 was repeated and the following ingredients were used:

| | |
|---|---|
| Dimethyl terephthalate | 19.22 g., .099 mole |
| Diethyl ester of p,p'-stilbene dicarboxylic acid from Example 2 | 0.32 g., .001 mole |
| Ethylene glycol | 50 ml. |
| Sodium | small piece |
| Magnesium | 1 turning |

The product was extruded into a fiber which showed cold drawing properties, fluorescence and good strength. The melting point was about 235° C.

From the foregoing illustrations and examples of this invention it will be apparent that I have developed new and useful linear polymers possessing valuable properties. Among these valuable properties which have been expressly discussed and illustrated is their fluorescence. Another valuable property of my linear polymers which has also been illustrated is their ability to modify the melting points of other known linear polymers, whereby the melting point characteristics are either raised or lowered depending on the proportions of my linear polymer present in the composition. Still another advantage is the presence in the resulting molecule of a carbon to carbon double bond which can be used for making derivative and various adducts of the polymers, if desired. A further advantage of the polymers of this type is their improved dye receptivity. Due to the presence of the double bond cross-linking by known means, such as vulcanization, may be effected with the polymers. These properties of my linear polymers, as well as other properties which are inherent in them, render them very useful in many applications for which linear polymers of a similar type have heretofore been utilized.

The linear polymers of this invention are especially useful in the preparation of yarns and fabrics because of their fiber-forming characteristics. They can also be utilized in other applications generally associated with linear polymers of this type such as coatings, molding compositions, films, bristles, etc.

The linear polymers of this invention may be used for these and other purposes, alone or in conjunction with other linear polymers such as polyesters and polyamides. They may also be utilized with other modifying agents such as plasticizers, natural or synthetic resins, antioxidants, pigments, delusterants, as well as other known additives.

Although my invention has been described in terms of its specific embodiments, certain modifications and equivalents will be apparent to those skilled in the art. I intend such variations to be included within the present invention which is to be limited only by the reasonable scope of the appended claims.

I claim:

1. A fiber-forming linear polymer which comprises the heat reaction product of reactants comprising (a) a member of the group consisting of stilbene dicarboxylic acid, its esters and amine salts, and (b) at least one bifunctional compound of the group consisting of glycols, diamines and amino alcohols having the formulae

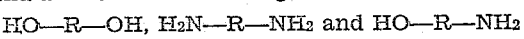

HO—R—OH, H₂N—R—NH₂ and HO—R—NH₂ wherein R is a member of the group consisting of alkylene, cycloalkylene, arylene and aralkylene radicals of from about 2 to 16 carbon atoms.

2. A fiber-forming linear polymer which comprises the heat reaction product of reactants comprising (a) a member of the group consisting of stilbene dicarboxylic acid, its esters and amine salts, (b) at least one bifunctional compound of the group consisting of glycols, diamines and amino alcohols having the formulae

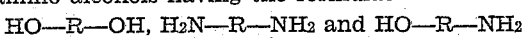

HO—R—OH, H₂N—R—NH₂ and HO—R—NH₂ where R is a member of the group consisting of alkylene, cycloalkylene, arylene and aralkylene radicals of from about 2 to 16 carbon atoms, and (c) a member of the group consisting of a dibasic organic acid other than stilbene dicarboxylic acid characterized by the presence of two carboxyl groups, its esters and amine salts.

3. A fiber-forming linear polyester which comprises the heat reaction product of reactants comprising (a) a member of the group consisting of stilbene dicarboxylic acid, its esters and amine salts, and (b) an unsubstituted glycol of the formula HO—R—OH, where R is a member of the group consisting of alkylene, cycloalkylene, arylene and aralkylene radicals of from about 2 to 16 carbon atoms.

4. A mixed acid fiber-forming linear polyester which comprises the heat reaction product of reactants comprising (a) a member of the group consisting of stilbene dicarboxylic acid, its esters and amine salts, (b) an unsubstituted glycol of the formula HO—R—OH, where R is a member of the group consisting of alkylene, cycloalkylene, arylene and aralkylene radicals of from about 2 to 16 carbon atoms and (c) a member of the group consisting of terephthalic acid, its esters and amine salts.

5. A fiber-forming linear polyester which comprises the heat reaction product of reactants comprising (a) a member of the group consisting of stilbene dicarboxylic acid, its esters and amine salts and (b) ethylene glycol.

6. A mixed acid fiber-forming linear polyester which comprises the heat reaction product of reactants comprising (a) a member of the group consisting of stilbene dicarboxylic acid, its esters and amine salts, (b) ethylene glycol and (c) a member of the group consisting of terephthalic acid, its esters and amine salts.

7. A mixed glycol fiber-forming linear polyester which comprises the heat reaction product of reactants comprising (a) a member of the group consisting of stilbene dicarboxylic acid, its esters and amine salts and (b) a mixture of at least two glycols of the formula HO—R—OH where R is a member of the group consisting of alkylene, cycloalkylene, arylene and aralkylene radicals of from about 2 to 16 carbon atoms.

8. A fiber-forming linear polyester which comprises the heat reaction product of reactants comprising the diethyl ester of stilbene dicarboxylic acid and ethylene glycol.

9. A fiber-forming linear polyester characterized by recurring units of the formula

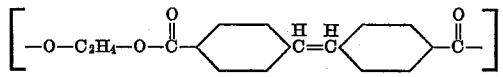

10. Polymeric ethylene stilbene dicarboxylate.

11. Polymeric ethylene p,p'-stilbene dicarboxylate.

12. Copolymeric ethylene p,p'-stilbene dicarboxylateterephthalate.

13. A method of preparing a fiber-forming linear polymer which comprises heating until thickened a mixture comprising (a) a member of the group consisting of stilbene dicarboxylic acid, its esters and amine salts, and (b) at least one bifunctional compound of the group consisting of glycols, diamines and amino alcohols having the formulae HO—ROH, H₂N—R—NH₂ and HO—R—NH₂ where R is a member of the group consisting of alkylene, cycloalkylene, arylene and aralkylene radicals of from about 2 to 16 carbon atoms.

14. A method of preparing a fiber-forming linear polyester which comprises heating until thickened a mixture comprising (a) a member of the group consisting of stilbene dicarboxylic acid, its esters and amine salts, and (b) an unsubstituted glycol of the formula HO—R—OH, where R is a member of the group consisting of alkylene, cycloalkylene, arylene and aralkylene radicals of from about 2 to 16 carbon atoms.

15. A method of preparing a mixed acid fiber-forming linear polyester which comprises heating until thickened a mixture comprising (a) a member of the group consisting of stilbene dicarboxylic acid, its esters and amine salts, (b) an unsubstituted glycol of the formula

HO—R—OH where R is a member of the group consisting of alkylene, cycloalkylene, arylene and aralkylene radicals of from about 2 to 16 carbon atoms and (c) a member of the group consisting of terephthalic acid, its esters and amine salts.

16. A method of preparing a fiber-forming linear polyester which comprises heating until thickened a mixture comprising the diethyl ester of p,p'-stilbene dicarboxylic acid and ethylene glycol.

WILLIAM G. TOLAND, Jr.

References Cited in the file of this patent

UNITED STATES PATENTS

| Number | Name | Date |
|---|---|---|
| 2,174,619 | Carothers | Oct. 3, 1939 |

FOREIGN PATENTS

| Number | Country | Date |
|---|---|---|
| 588,497 | Great Britain | May 22, 1947 |
| 621,102 | Great Britain | Apr. 4, 1949 |